(No Model.) 2 Sheets—Sheet 1.
R. INGRAM & W. R. COULBOURN.
ANTIFRICTION JOURNAL BEARING.
No. 575,426. Patented Jan. 19, 1897.
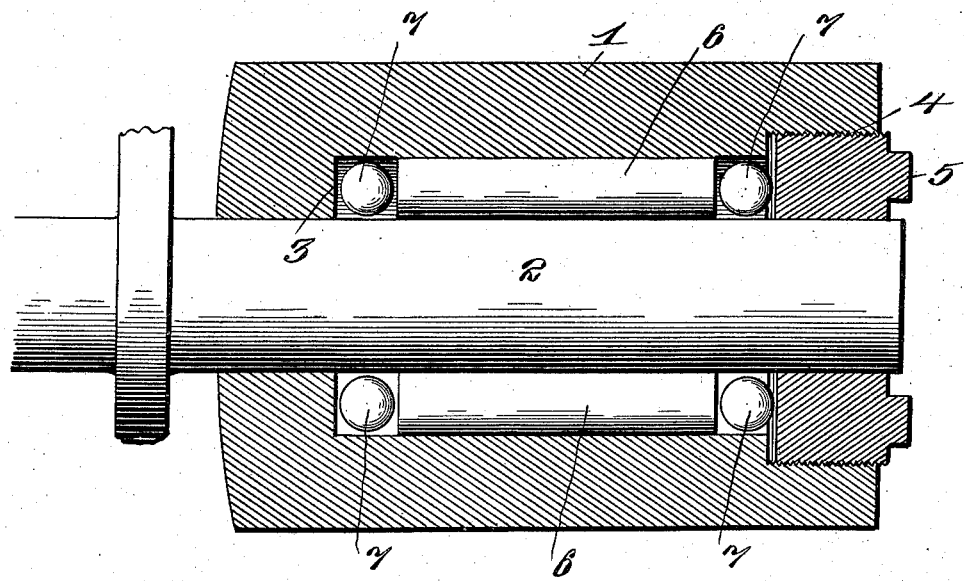
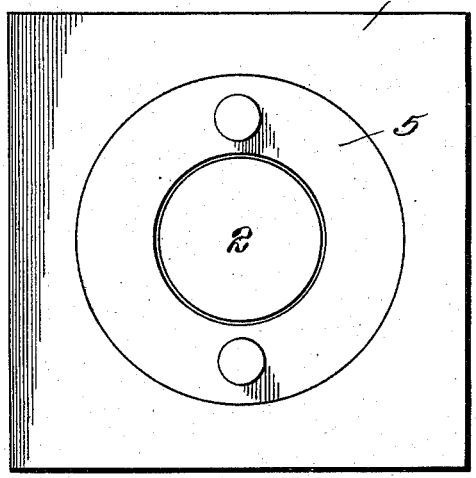
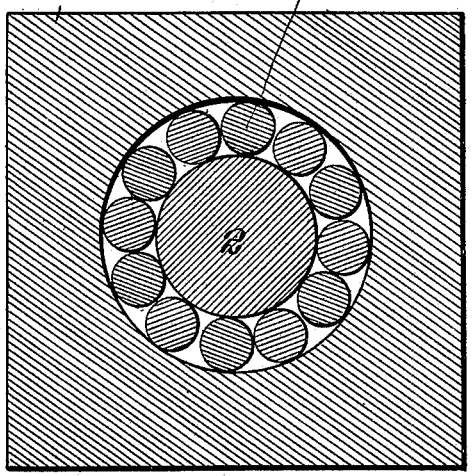
Witnesses
H. J. Koerth.
R. M. Smith.
Inventors
Richard Ingram and
William R. Coulbourn,
By their Attorneys,
C. A. Snow & Co.

(No Model.) 2 Sheets—Sheet 2.
R. INGRAM & W. R. COULBOURN.
ANTIFRICTION JOURNAL BEARING.
No. 575,426. Patented Jan. 19, 1897.
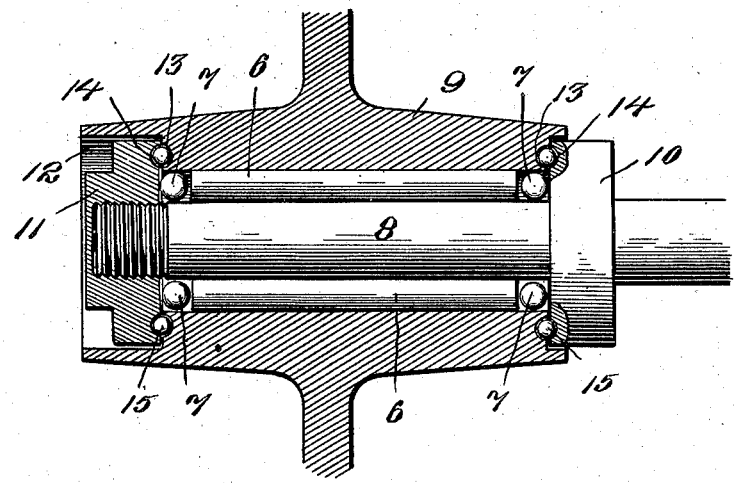
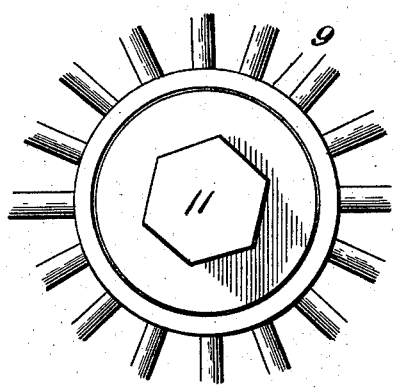 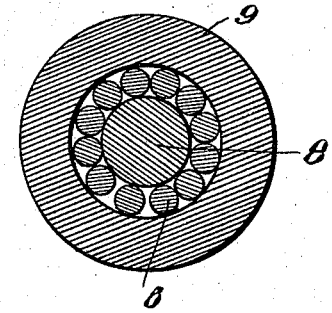
Witnesses
W. J. Koerth.
R. M. Smith.
Inventors
Richard Ingram,
William R. Coulbourn,
By their Attorneys,
C. A. Snow & Co.

UNITED STATES PATENT OFFICE

RICHARD INGRAM AND WILLIAM R. COULBOURN, OF ROANOKE, VIRGINIA, ASSIGNORS OF ONE-SIXTH TO JAMES D. PRICE, OF SAME PLACE.

ANTIFRICTION JOURNAL-BEARING.

SPECIFICATION forming part of Letters Patent No. 575,426, dated January 19, 1897.

Application filed May 19, 1896. Serial No. 592,151. (No model.)

*To all whom it may concern:*

Be it known that we, RICHARD INGRAM and WILLIAM R. COULBOURN, citizens of the United States, residing at Roanoke, in the county of Roanoke and State of Virginia, have invented a new and useful Antifriction Journal-Bearing, of which the following is a specification.

This invention relates to antifriction journal-bearings; and the object in view is to provide an improved bearing which may be used either upon a stationary axle and with a revolving axle-box or upon a revolving axle in connection with a stationary axle-box, said bearing reducing friction to a minimum by doing away altogether with sliding surfaces.

A further object of the invention is to do away with brasses in railway journal-boxes and the expense incident thereto, and also to avoid oil-sponging, together with its consequent expense, filth, and unsightliness, and also to economize in the use of oil, thus materially reducing the running expenses of the road.

With the above general objects in view the invention consists in an improved journal-bearing embodying certain novel features and details of construction and arrangement of parts, as hereinafter fully described, illustrated in the drawings, and finally incorporated in the claim hereto appended.

In the accompanying drawings, Figure 1 is a longitudinal section through a journal-box, illustrating the improved bearing as applied to a rotary axle. Fig. 2 is an end elevation of the same. Fig. 3 is a cross-section through the same. Fig. 4 is a longitudinal section taken through a wheel-hub, illustrating the improved bearing as applied to a stationary axle. Fig. 5 is an end elevation of the same. Fig. 6 is a cross-section through the same.

Similar numerals of reference designate corresponding parts in the several figures of the drawings.

Referring to the accompanying drawings, 1 designates a stationary journal-box, which may be of any desired construction so as to fit within the pedestals of ordinary car-trucks or car-gears or other places, and 2 indicates an axle mounted to revolve therein. The box 1 is provided interiorly adjacent to its inner end with an annular shoulder 3, forming the inner wall of the box, and said box is provided at its outer end with an annular rabbet 4, which is internally threaded, as shown, and into which an annular nut 5 is screwed and adapted to be adjusted for the purpose of taking up wear in the bearing, any suitable means being employed in connection with the nut 5 for holding the same against backing. The axle 2 passes through and fits snugly in the inner end of the journal-box and the nut 5, and an annular or cylindrical shaped space is thus left between the axle and inner wall of the journal-box, in which is placed a series of antifriction-rollers 6 and antifriction-balls 7.

The rollers 6 are preferably of steel and are in the shape of true cylinders. They are all equal in length, and the length of each one is considerably less than the distance between the shoulder 3 and the inner face of the nut 5. A sufficient number of these rollers is employed to surround the axle, and between the outer ends of the rollers and the inner face of the nut 5 is arranged a circular series of balls 7, and another similar series of balls is arranged between the inner ends of said rollers and the shoulder 3 at the inner end of the journal-box. These antifriction-balls, which are in the form of true spheres, have a diameter less than the diameter of the rollers 6, and their diameter is also less than the distance between the ends of the rollers and the inner face of the nut 5 and the distance between the inner ends of the rollers and the shoulder 3 of the journal-box.

By reason of the construction described the entire weight of the load is carried by and distributed upon the antifriction-rollers 6, and by reason of the balls 7 being interposed between the ends of said rollers and the stationary inner surfaces of the journal-box the ends of said rollers are prevented from contacting with such stationary surfaces, their endwise movements being limited by the balls 7, with which they come in contact, and as there can be but a single touching or contact point between the end of the roller and such ball the resultant friction will be almost inappreciable.

In Figs. 4, 5, and 6 we have shown the same principle applied to a stationary axle and a revolving hub or wheel. In these figures, 8 designates the stationary axle, and 9 the wheel-hub. The axle is provided at the inner end of its spindle portion with a collar 10, forming the inner shoulder for the hub, and is provided at its outer end with a threaded portion, upon which is received the axle-nut 11, said nut being also received as to its peripheral portion in an annular recess or rabbet 12 in the outer end of the hub 9. The same arrangement of rollers 6 and balls 7 obtains in the present construction as in that hereinabove previously described, and it will therefore be unnecessary to go into a further description of the same. It is, however, important under this arrangement to guard against the end thrust of the hub and the friction which would result therefrom, and this is accomplished by forming annular grooves 13 in the ends of the hub 9 and in providing the collar 10 and the axle-nut 11 with opposing corresponding grooves 14.

The means for closing the ends of the hub, as shown in Fig. 4, are necessarily different from those shown in Fig. 1, owing to the fact that said two figures illustrate two types of journal-boxes, and where these parts are referred to hereinafter they are designated as "end closures," this term being intended to include both structures.

Circular series of antifriction-balls 15 are arranged and travel in the grooves 14 and serve to hold the hub and the axle in their proper relative positions, at the same time relieving the friction which would otherwise occur if the ends of the hub abutted directly against the adjacent surfaces of the axle-collar and axle-nut. This particular arrangement of the balls 15 also serves to exclude dust, dirt, and other foreign matter from the journal-bearing proper.

From the foregoing description it will be readily apparent that the friction between the axle and the journal-box is materially reduced as compared with the ordinary constructions in which collars or flanges, either on the axle or within the journal-box, are interposed between the rollers and the balls, as it is obvious that the ends of the rollers would impinge against such collars or flanges and thereby produce the friction which it is the object of this invention to overcome.

By the construction described the traction of all vehicles, cars, &c., to which the improvement is applied is lessened and at the same time the use of brasses and the incidental expense thereof are dispensed with. The bearing will run with an extremely small quantity of oil, thus decreasing the running expenses in this way, and the necessity of oil-sponging, together with the expense, filth, and unsightliness incident thereto, is overcome.

It will be apparent that changes in the form, proportion, and minor details of construction in respect of the journal-box, &c., may be resorted to without departing from the spirit or sacrificing any of the advantages of this invention.

Having thus described the invention, what is claimed as new is—

In a journal-bearing, a journal-box having a cylindrical cavity therein and end closures therefor, a journal extending through said cavity, in combination with a circular series of loosely-arranged antifriction-rollers having flat ends and surrounding said journal within the box for sustaining the weight of the load, and a series of antifriction-balls loosely arranged in the spaces between the ends of the rollers and the end closures of the box, said balls working in circular paths independently of the rollers and also adapted to impinge directly against the ends of the rollers and the end closures of the box for taking the end thrusts of the rollers, said balls each having a diameter less than that of the rollers as and for the purpose described.

In testimony that we claim the foregoing as our own we have hereto affixed our signatures in the presence of two witnesses.

RICHARD INGRAM.
WILLIAM R. COULBOURN.

Witnesses:
S. S. BROOKE,
JAMES J. CASEY.